(12) United States Patent  
Zheng et al.

(10) Patent No.: US 8,274,498 B2
(45) Date of Patent: Sep. 25, 2012

(54) DISPLAY SYSTEM WITH FIRST CONTROLLER PROVIDING ANALOG IMAGE SIGNAL FROM SIZE REGULATOR TO DISPLAY DEVICE WHEN THE FIRST CONTROLLER DETERMINING THAT THE DISPLAY DEVICE IS AN ANALOG DISPLAY DEVICE WORKING IN A MODE FOR DISPLAYING MOVING PICTURES AND RELATED DISPLAY METHOD

(75) Inventors: Gang-Qiang Zheng, Shenzhen (CN); Bin Yang, Shenzhen (CN)

(73) Assignees: Innocom Technology (Shenzhen) Co., Ltd., Shenzhen, Guangdong Province (CN); Chimei Innolux Corporation, Miaoli County (TW)

( * ) Notice: Subject to any disclaimer, the term of this patent is extended or adjusted under 35 U.S.C. 154(b) by 1037 days.

(21) Appl. No.: 11/982,870

(22) Filed: Nov. 5, 2007

(65) Prior Publication Data

US 2008/0106536 A1    May 8, 2008

(30) Foreign Application Priority Data

Nov. 3, 2006   (TW) .............................. 95140752 A

(51) Int. Cl.
    *G09G 5/00*    (2006.01)
(52) U.S. Cl. ........................................ 345/204; 345/207

(58) Field of Classification Search ............ 345/87–104, 345/635, 204, 207, 473, 672, 682; 348/333.01; 396/157

See application file for complete search history.

(56) References Cited

U.S. PATENT DOCUMENTS

| 6,903,767 B2 | 6/2005 | Robins et al. |
| 2001/0012071 A1* | 8/2001 | Oeda et al. ............... 348/333.01 |
| 2001/0017630 A1* | 8/2001 | Sakashita et al. ............. 345/635 |
| 2004/0179112 A1 | 9/2004 | Chen |
| 2005/0031333 A1* | 2/2005 | Yamazaki et al. ............ 396/157 |
| 2006/0132421 A1* | 6/2006 | Tsutsui ........................... 345/98 |
| 2006/0192741 A1* | 8/2006 | Hirakawa et al. ............... 345/98 |

FOREIGN PATENT DOCUMENTS

| CN | 2472270 Y | 1/2002 |
| CN | 1374622 A | 10/2002 |
| TW | I228680 B | 3/2005 |
| TW | 200628955 A | 8/2006 |

* cited by examiner

*Primary Examiner* — Chanh Nguyen
*Assistant Examiner* — Sanghyuk Park
(74) *Attorney, Agent, or Firm* — WPAT, PC; Justin King

(57) ABSTRACT

An exemplary display system (2) includes a display device (23), an image sensor (20), and a microprocessor unit (21). The image sensor includes an image sensor unit (24) and a digital signal processor unit (22) integrated therein. The image sensor unit is configured for generating a current. The digital signal processor includes a size regulator (221) configured for receiving the current, generating an analog image signal according to the current, and providing the analog image signal to the display device. The microprocessor unit is configured for initializing the image sensor unit.

9 Claims, 2 Drawing Sheets

DISPLAY SYSTEM WITH FIRST CONTROLLER PROVIDING ANALOG IMAGE SIGNAL FROM SIZE REGULATOR TO DISPLAY DEVICE WHEN THE FIRST CONTROLLER DETERMINING THAT THE DISPLAY DEVICE IS AN ANALOG DISPLAY DEVICE WORKING IN A MODE FOR DISPLAYING MOVING PICTURES AND RELATED DISPLAY METHOD

FIELD OF THE INVENTION

The present invention relates to display systems and methods for displaying images on display devices.

GENERAL BACKGROUND

Photosensors have been widely used in various portable information products, such as notebooks, still cameras, video cameras, mobile phones, and the like. Normally, a product using photosensors typically includes a display device such as a liquid crystal display, which can be considered as being part of a display system of the product.

FIG. 3 is a block diagram of a typical display system 1. The display system 1 includes a micro processor unit (MPU) 11, an image sensor 14, a digital signal processor (DSP) 12, and a display device 13.

The image sensor 14 includes a number of photodiodes (not shown). When light irradiates each photodiode, a current is generated according to the intensity of the light, and the current is then provided to the DSP 12. The DSP 12 transforms the current into an image signal and provides the image signal to the display device 13. The MPU 11 is configured for initializing the DSP 12 and providing operational parameters to the DSP 12. When the process of initializing the DSP 12 is completed, the DSP 12 generates a startup signal and provides the startup signal to the image sensor 14. Parameters provided to the DSP 12 may represent a type or a size of the display device 13.

Normally, the DSP 12 includes some standard circuits (not shown) integrated therein, such as an analog-to-digital converter, a digital-to-analog converter, a filter circuit, an amplifier, and a compressor circuit. Thus the cost of the DSP 12 is high, and the cost of the display system 1 using the DSP 12 is correspondingly high. Furthermore, the display system 1 may not necessarily use all the circuits of the DSP 12. In such case, the display system 1 is unduly complicated and costly.

It is desired to provide a display device which can overcome the above-described deficiencies.

SUMMARY

In one preferred embodiment, a display system includes a display device, an image sensor, and a microprocessor unit. The image sensor includes an image sensor unit and a digital signal processor unit integrated therein. The image sensor unit is configured for generating a current. The digital signal processor includes a size regulator configured for receiving the current, generating an analog image signal according to the current, and providing the analog image signal to the display device. The microprocessor unit is configured for initializing the image sensor unit.

Other novel features and advantages will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail. In the following description, unless the context indicates otherwise, a reference to a "signal" includes where appropriate a reference to a group of signals, and includes where appropriate a reference to data.

Figure 1:
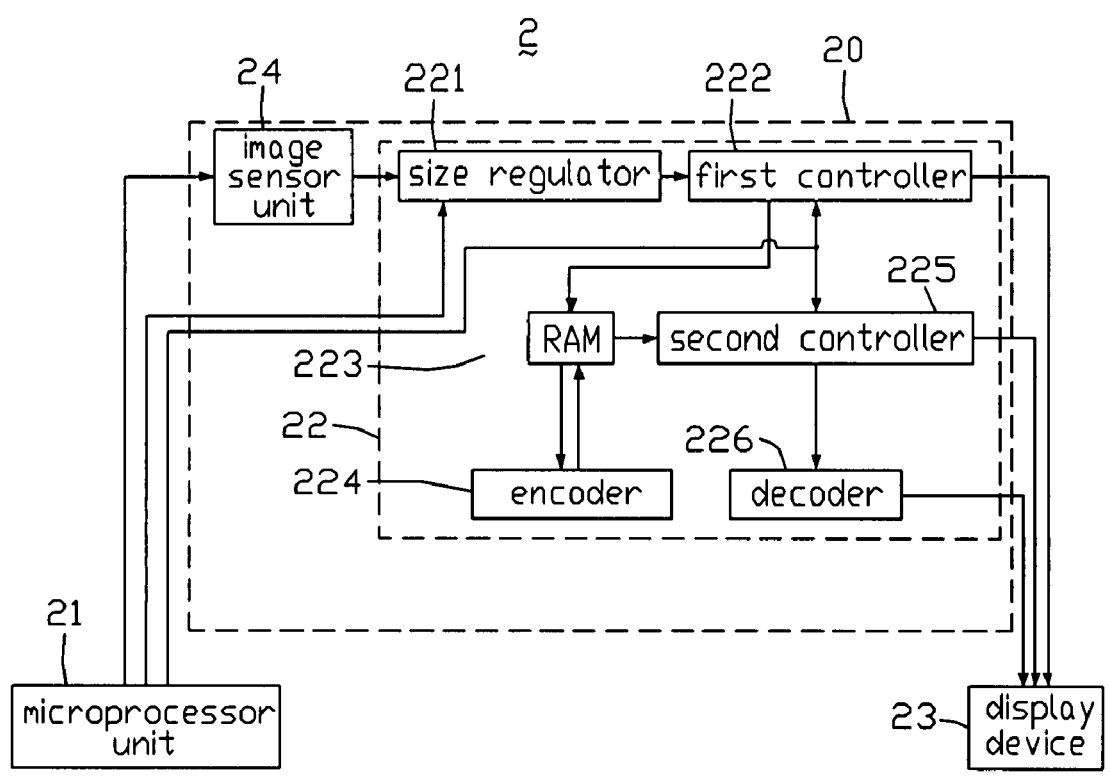
FIG. 1 is a block diagram including circuitry of a display system according to an exemplary embodiment of the present invention.

Referring to FIG. 1, a display system 2 according to an exemplary embodiment of the present invention is shown. The display system 2 includes an image sensor 20, a microprocessor unit 21, and a display device 23.

The image sensor 20 includes an image sensor unit 24 and a digital signal processor unit 22 integrated therein.

The image sensor unit 24 includes a number of photodiodes (not shown). When light irradiates each photodiode, a current is generated according to the intensity of the light.

The digital signal processor unit 22 includes a size regulator 221, a first controller 222, a second controller 225, a random access memory (RAM) 223, an encoder 224, and a decoder 226. The size regulator 221 transforms the current into an image signal, generates an analog image signal with a predetermined displaying size according to the image signal, and provides the analog image signal to the first controller 222. The first controller 222 provides the analog image signal to the display device 23 or the RAM 223 according to a type of the display device 23. The encoder 224 receives the analog image signal from the RAM 223, transforms the analog image signal to a digital image signal, and stores the digital image signal in the RAM 223. The RAM 223 provides the digital image signal to the second controller 225. The second controller 225 directly provides the received digital image signal to the display device 23, or provides the digital image signal to the display device 23 via the decoder 226. The decoder 226 is used to transform the digital image signal to an analog image signal.

The microprocessor unit 21 is configured to initialize the image sensor unit 24, provide parameters of image sizes to the size regulator 221, and provide related parameters of the display device 23 such as a type and a size of the display device 23 to the first and second controllers 222, 225.

Figure 2:
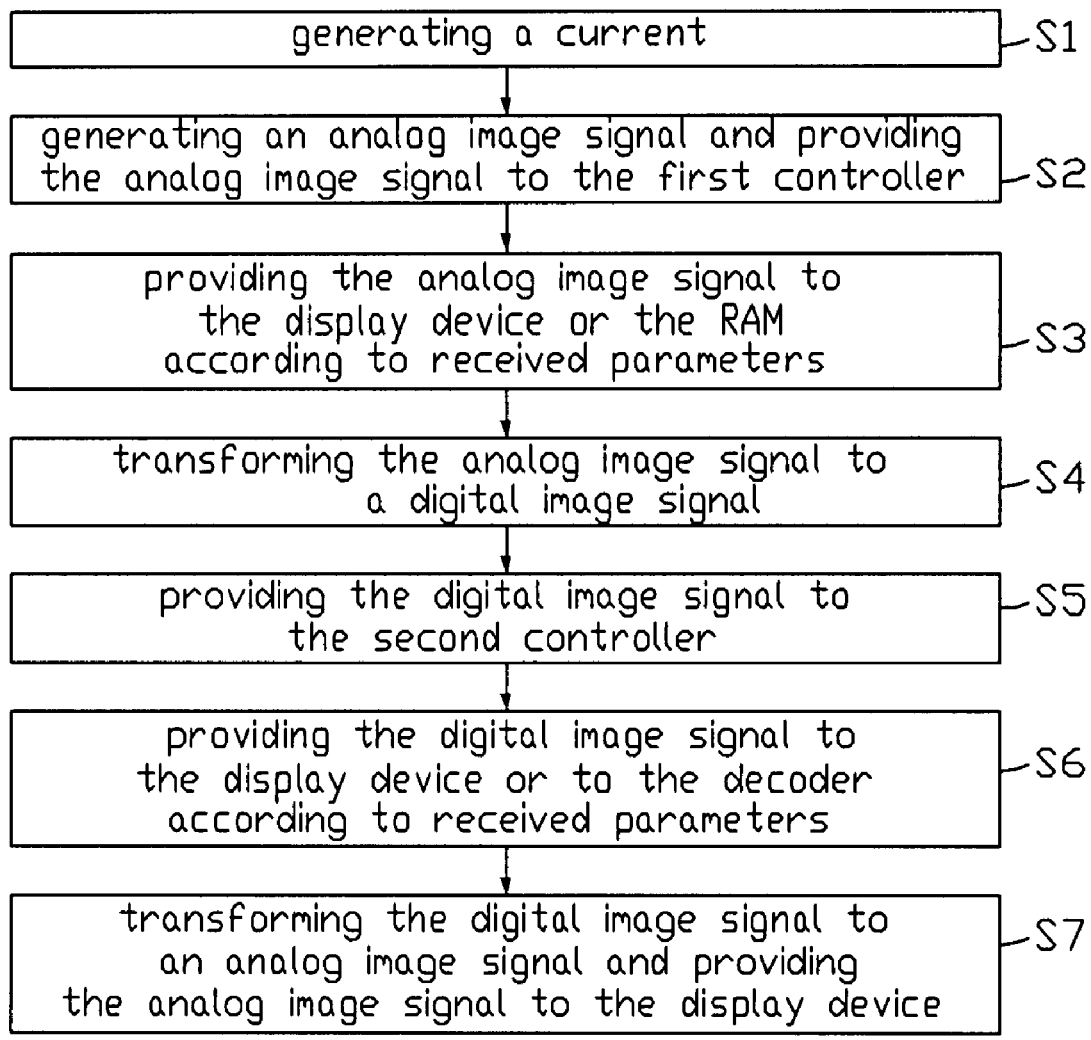
FIG. 2 is a flow chart summarizing exemplary operation of the display system of FIG. 1.
Figure 3:
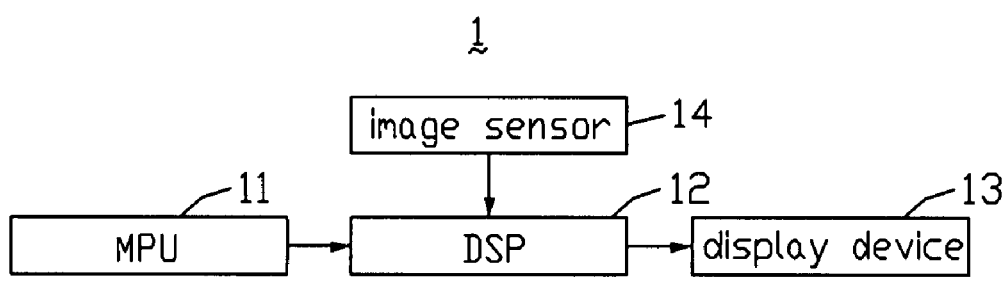
FIG. 3 is a block diagram of a conventional display system.

Referring to FIG. 2, exemplary operation of the display system 2 includes: step S1, generating a current; step S2, generating an analog image signal and providing the analog image signal to the first controller 222; step S3, providing the analog image signal to the display device 23 or the RAM 223 according to received parameters; step S4, transforming the analog image signal to a digital image signal; step S5, providing the digital image signal to the second controller 225; step S6, providing the digital image signal to the display device 23 or to the decoder 226 according to received parameters; and step S7, transforming the digital image signal to an analog image signal, and providing the analog image signal to the display device 23.

In step S1, when the microprocessor unit 21 provides an initializing signal to the image sensor unit 24, the image sensor unit 24 starts to capture incoming light originating from an external object selected by a user, and generates a current according to the intensity of the light emitted from different portions of the object.

In step S2, the microprocessor unit 21 provides parameters of image sizes to the size regulator 221. The size regulator 221 receives the current from the image sensor unit 24 and the parameters of image sizes from the microprocessor unit 21, generates an analog image signal according to the current and the parameters of image size, and provides the analog image signal to the first controller 222.

In step S3, the microprocessor 21 provides a first type parameter or a second type parameter of the display device 23 to the first controller 222. The first type parameter represents that the display device 23 is an analog display device and works in a mode for displaying moving pictures. The second type parameter represents that the display device 23 is a digital display device. When the first type parameter is received, the first controller 222 directly provides the analog image signal to the display device 23. When the second type parameter is received, the first controller 222 provides the analog image signal to the RAM 223. Thus the analog image signal is stored in the RAM 223.

In step S4, the encoder 224 is configured to take the analog image signal from the RAM 223, transform the analog image signal to a digital image signal, and store the digital image signal in the RAM 223.

In step S5, the digital image signal is provided from the RAM 223 to the second controller 225.

In step S6, the microprocessor 21 provides a third type parameter or a fourth type parameter of the display device 23 to the second controller 225. The third type parameter represents that the display device 23 is an analog display device and works in a mode for displaying still pictures. The fourth type parameter represents that the display device 23 is a digital display device. When the fourth type parameter is received, the second controller 225 directly provides the digital image signal to the display device 23. When the third type parameter is received, the second controller 225 provides the digital image signal to the decoder 226.

In step S7, the decoder 226 transforms the digital image signal into an analog image signal, and then provides the analog image signal to the display device 23.

Because the image sensor 20 includes an image sensor unit 24 and a digital signal processor unit 22 integrated therein for dealing with the current generated by the image sensor unit 24, the display system 2 does not need a conventional DSP. Furthermore, the digital signal processor unit 22 has no redundant circuits such as an amplifier, a transformer, and a compressor circuit. Thus the display system 2 using the digital signal processor unit 22 is simple and inexpensive.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A display system comprising:
    a display device;
    an image sensor comprising an image sensor unit and a digital signal processor unit integrated therein, the image sensor unit being configured for generating a current; and
    a microprocessor unit configured for initializing the image sensor unit;
    wherein the digital signal processor comprises a size regulator, a first controller directly connected to the display device, an encoder, a second controller, and a decoder;
    wherein the size regulator is configured for receiving the current, generating an analog image signal according to the current, and proving the analog image signal to the first controller;
    wherein the first controller is configured for receiving the analog image signal from the size regulator, and in response to the first controller determining that the display device is only an analog display device working in a mode for displaying moving pictures, directly providing the analog image signal from the size regulator to the display device, and in response to the first controller determining that the display device is not an analog display device working in a mode for displaying moving pictures, providing the analog image signal from the size regulator to the encoder;
    wherein the encoder is configured for transforming the analog image signal to a digital image signal, and providing the digital image signal to the second controller;
    wherein the second controller is configured for receiving the digital image signal from the encoder, determining if the display device is a digital display device or an analog display device working in a mode for displaying still pictures;
    wherein when the second controller determines that the display device is a digital display device, providing the digital image signal from the encoder to the display device;
    wherein when the second controller determines that the display device is an analog display device working in a mode for displaying still pictures, providing the digital image signal from the encoder to the decoder;
    wherein the decoder is configured for transforming the digital image signal to an analog image signal and providing the analog image signal to the display device.

2. The display system as claimed in claim 1, wherein the microprocessor is configured for providing a plurality of parameters respectively to the first controller and the second controller.

3. The display system as claimed in claim 2, wherein the parameters comprises a first parameter and a second parameter that are provided to the first controller, and a third parameter and a fourth parameter that are provided to the second controller.

4. The display system as claimed in claim 3, wherein the first parameter represents that the display device is an analog display device working in a mode for displaying moving pictures.

5. The display system as claimed in claim 3, wherein when the first controller receives the second parameter, the first controller provides the analog image signal from the size regulator to the encoder.

6. The display system as claimed in claim 3, wherein the third parameter represents that the display device is an analog display device working in a mode for displaying still pictures.

7. The display system as claimed in claim 3, wherein the fourth parameter represents that the display device is a digital display device.

8. The display system as claimed in claim 1, wherein the image sensor unit comprises a plurality of photodiodes configured for generating current according to the intensity of the light irradiated to each photodiode.

9. The display system as claimed in claim 1, wherein the microprocessor provides a parameter of image sizes to the size regulator.

* * * * *